L. C. SHIPLEY.
VEHICLE TOP.
APPLICATION FILED JAN. 5, 1914.
1,118,591.
Patented Nov. 24, 1914.
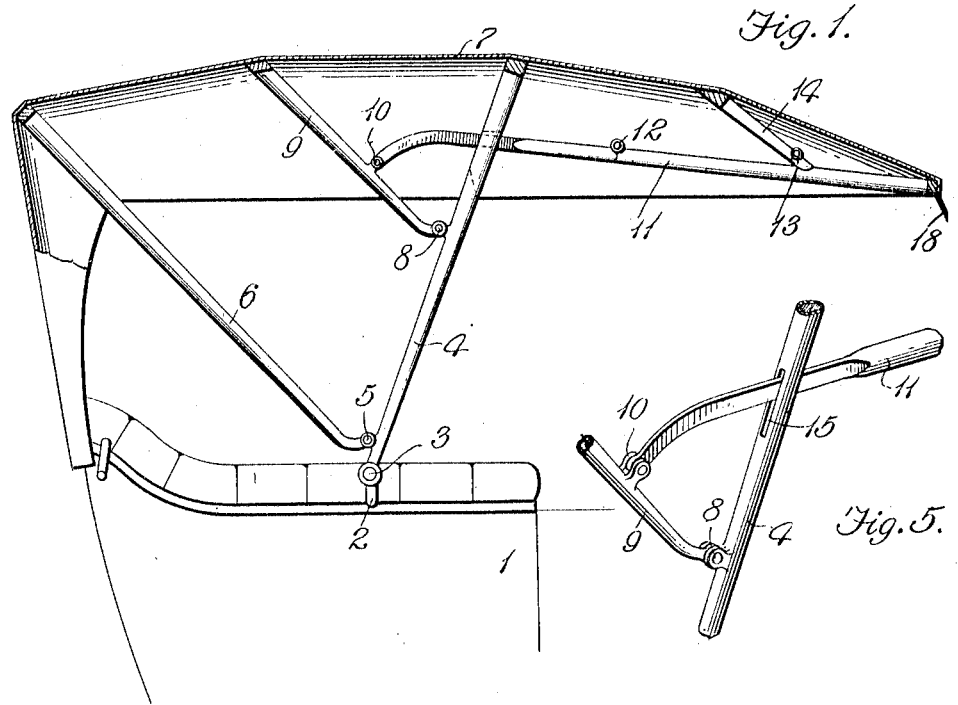
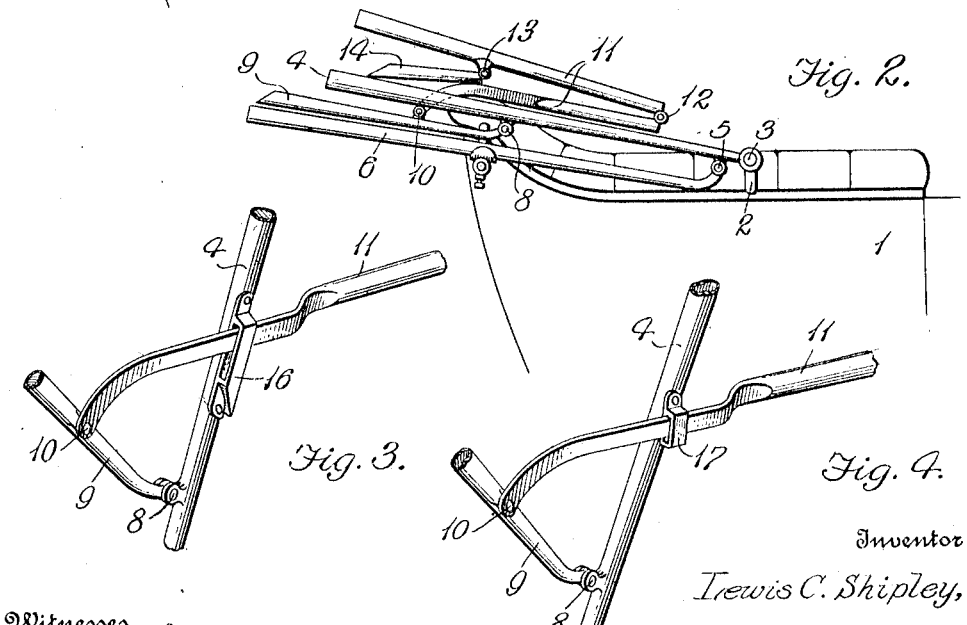
Witnesses
Chas. W. Stauffiger
Anna M. Dore
Inventor
Lewis C. Shipley,
By Barthel & Barthel
Attorneys

UNITED STATES PATENT OFFICE.

LEWIS C. SHIPLEY, OF DETROIT, MICHIGAN.

VEHICLE-TOP.

1,118,591. Specification of Letters Patent. Patented Nov. 24, 1914.

Application filed January 5, 1914. Serial No. 810,527.

*To all whom it may concern:*

Be it known that I, LEWIS C. SHIPLEY, a citizen of the United States of America, residing at Detroit, in the county of Wayne and State of Michigan, have invented certain new and useful Improvements in Vehicle-Tops, of which the following is a specification, reference being had therein to the accompanying drawings.

This invention relates to vehicle tops, and more particularly to that type of hood or canopy designed for a one seated vehicle and adapted to be collapsed or folded when not in use.

The primary object of my invention is to provide a vehicle top that can be readily used in connection with various types of vehicles for providing a hood or canopy that extends well over the seat of the vehicle and presents a rigid and durable structure that can be easily set up to shield the occupants of the vehicle against the forces of nature.

A further object of this invention is to provide a simple and inexpensive vehicle top embodying novel bows and connections that are easy to manipulate when collapsing the top, the arrangement of the bows being such that they occupy a comparatively small space in a folded position without interfering with entrance to the vehicle body.

How I obtained the above and other objects will hereinafter appear, and reference will now be had to the drawing, wherein, Figure 1 is a side elevation of a vehicle top in accordance with this invention, illustrating the same in a set up position; Fig. 2 is a similar view showing the top in a folded or collapsed position, and Figs. 3, 4 and 5 are perspective views of a bow connection of different forms.

In the drawing, the reference numeral 1 denotes a portion of a vehicle body having the sides thereof provided with irons 2 and pivotally connected to said irons in the ordinary and well known manner are the lower ends 3 of front bows 4. Adjacent to the lower ends 3 of said bows are eyes 5 and pivotally connected to said eyes are rear bows 6 that coöperate with the front bows 4 in supporting a hood or canopy 7.

The front bows 4, intermediate their ends, are provided with eyes 8 that extend rearwardly and pivotally support intermediate bows 9. The bows 9 are provided with eyes 10 and pivotally connected to said eyes are forwardly extending over-hanging sectional bows 11 that have the sections thereof connected by rule joints 12. The outer or forward sections of the bows 11, intermediate their ends, are provided with eyes 13 and pivotally connected to said eyes are curving bows 14, it of course being understood that the ends of the bows 14, 4, 9 and 6 are connected by transverse members that support the hood or canopy 7, as shown in Fig. 1 of the drawing.

The sectional bows 11 extend through slots 15 provided therefor in the front bows 4, and the upper and lower walls of the slots 15 are disposed at an angle, whereby the front bows 4 can be folded toward the rear bows 6 and the sectional bows 11 folded toward the front bows 4. This is best shown in Fig. 2 of the drawing, where it will be observed that the hood or canopy is pretty well in the rear and does not interfere with persons entering the vehicle body.

In lieu of providing the front bows 4 with the slots 15, a slotted member 16 can be secured to the bow, as shown in Fig. 3, or, as illustrated in Fig. 4, the bow can be provided with a pivoted strap 17. The straps 17 can easily swing relatively to the front bows 4 to permit of the sectional bows 11 being collapsed, and shown in Figs. 3 and 4, and the inner sections of the bows 11 are off-set, thus permitting of the sections of the bows 11 being folded with the curving bows 14 folded as shown in Fig. 2.

Straps 18 can be used in connection with the forward end of the vehicle top, and it is through the medium of the sectional bows 11 and the curving bows 14 that the hood or canopy can extend a considerable distance forward and provide a symmetrical structure that will harmonize with the general lines of the vehicle body.

While in the drawings there are illustrated the preferred embodiments of my invention, I desire it to be understood that the structural elements are susceptible to such change, as in the size, proportion and manner of assemblage, as fall within the scope of the appended claims.

What I claim is:—

1. In a vehicle top, the combination with a hood, of front bows, rear bows pivotally connected to said front bows, intermediate bows pivotally connected to said front bows, sectional bows pivotally connected to said intermediate bows and having a sliding connection with said front bows, and curving bows pivotally connected to said sectional bows and coöperating with said front, rear and intermediate bows in supporting said hood.

2. In a vehicle top, the combination with a hood, of front bows, rear bows pivotally connected thereto, intermediate bows pivotally connected to said front bows and adapted to be folded between said front and rear bows, sectional bows pivotally connected to said intermediate bows and having a sliding connection with said front bows and adapted to be folded above said front bows, and curving bows pivotally connected to said sectional bows and adapted to be folded between the sections of said bows.

3. In a vehicle top, the combination with a hood, front bows, and rear bows pivotally connected to said front bows and coöperating therewith in supporting said hood, of slotted members pivotally connected to said front bows intermediate bows pivotally connected to said front bows, and sectional bows pivotally connected to said intermediate bows and extending through said members and coöperating with said front, rear and intermediate bows in supporting said hood in a set-up position.

In testimony whereof I affix my signature in presence of two witnesses.

LEWIS C. SHIPLEY.

Witnesses:
 ANNA M. DORR,
 KARL H. BUTLER.

Copies of this patent may be obtained for five cents each, by addressing the "Commissioner of Patents, Washington, D. C."